United States Patent
Inoue (10) Patent No.: US 8,231,226 B2
(45) Date of Patent: Jul. 31, 2012

(54) ILLUMINATION OPTICAL SYSTEM AND IMAGE PROJECTION APPARATUS

(75) Inventor: Chiaki Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/542,592

(22) Filed: Aug. 17, 2009

(65) Prior Publication Data

US 2010/0045936 A1 Feb. 25, 2010

(30) Foreign Application Priority Data

Aug. 19, 2008 (JP) ................. 2008-211103

(51) Int. Cl.
G03B 21/26 (2006.01)
(52) U.S. Cl. ........................................ 353/30
(58) Field of Classification Search ............. 353/30, 353/31, 38, 102; 359/618–640
See application file for complete search history.

(56) References Cited

U.S. PATENT DOCUMENTS 5,098,184 A 3/1992 van den Brandt et al.
5,666,226 A * 9/1997 Ezra et al. ............... 359/621

FOREIGN PATENT DOCUMENTS

| JP | 3-111806 A | 5/1991 |
| JP | 2002-184206 A | 6/2002 |
| JP | 2003-218017 A | 7/2003 |
| JP | 2004-220016 A | 8/2004 |

* cited by examiner

Primary Examiner — Georgia Y Epps
Assistant Examiner — Renee Naphas
(74) Attorney, Agent, or Firm — Canon U.S.A., Inc. IP Division (57) ABSTRACT

An illumination optical system 1 includes a light source 11 including a plurality of light emitting sections 11a, 11b, and 11c arrayed in a specific direction, and an integrator 21 including a plurality of lens cells arrayed in the specific direction, and it illuminates a plane to be illuminated 31 by a light beam emitted from the plurality of light emitting sections and passing through the integrator. A plurality of light beams from the plurality of light emitting sections enter an incident surface of the integrator with a shift from each other in the specific direction, as divergent light beams, each of which spreads in the specific direction. Two light beams from two light emitting sections adjacent to each other among the plurality of light emitting sections are overlapped with each other in a region Lm larger than one of the lens cells on the incident surface of the integrator.

5 Claims, 6 Drawing Sheets

ILLUMINATION OPTICAL SYSTEM AND IMAGE PROJECTION APPARATUS

BACKGROUND OF THE INVENTION

1. Field of the Invention

The present invention relates to an illumination optical system which has a light source including a plurality of light emitting sections and an image projection apparatus which is provided with the illumination optical system.

2. Description of the Related Art

An image projection apparatus such a projector modulates illumination light from a light source using a spatial light modulation element such as a liquid crystal panel or a micromirror array device to display an image by projecting the modulated light onto a plane to be projected such as a screen.

As a light source used for the image projection apparatus, generally, a high-intensity discharge lamp such as an extra high pressure mercury lamp, a metal halide lamp, or a xenon lamp is used. However, in the case of using the high-intensity discharge lamp, the apparatus grows in size because a cooling system is necessary for releasing heat, or the exchange of the lamp at a constant lighting time is necessary because the life of the lamp is short. Therefore, as a light source, the use of a semiconductor light emitting element, which does not need a large cooling system and has a life longer than that of the lamp, has been required.

However, in the case where the semiconductor light emitting element is used as a light source at present, a plurality of semiconductor light emitting elements need to be arrayed for obtaining adequate light intensity.

On the other hand, in order to illuminate a spatial light modulation element, i.e. a plane to be illuminated, with uniform illumination by light from a light source, an illumination optical system using a fly-eye lens including a plurality of lens cells, a rod lens, or the like has been proposed.

For example, Japanese Patent Laid-Open No. 3-111806 discloses that light from a light source is divided into a plurality of light beams by a first fly-eye lens and the plurality of light beams are overlapped on a spatial light modulation element by a second fly-eye lens and a condenser lens to uniformly illuminate a plane to be illuminated.

An array light source having a plurality of light emitting sections can also be used as such an illumination system. For example, Japanese Patent No. 3987350 discloses an illumination optical system which has a light emitting section provided for each lens cell of a fly-eye lens in an array light source, and uniformly illuminates a plane to be illuminated by changing a light beam entering position from each light emitting section to each lens cell.

Japanese Patent Laid-Open No. 2002-184206 discloses an illumination optical system which uniformly illuminates a plane to be illuminated on condition that a divergent light beam from each light emitting section is paralleled by a lens array in an array direction of light emitting sections of an array light source and that the light beams from a plurality of light emitting sections enter each lens cell of a fly-eye lens.

Furthermore, Japanese Patent Laid-Open No. 2004-220016 discloses an illumination optical system which uniformly illuminates a plane to be illuminated by paralleling a divergent light beam from each light emitting section of an array light source by a parallel lens and by dividing the parallel light beam by a plurality of lens cells.

Like illumination optical systems disclosed in Japanese Patent No. 3987350, Japanese Patent Laid-Open No. 2002-184206, and Japanese Patent Laid-Open No. 2004-220016, a light intensity as a whole array light source can be increased by using the array light source even if a light intensity of each light emitting section in the array light source is small. Furthermore, a plane to be illuminated can be uniformly illuminated if the light emitting intensity distribution of each light emitting section of the array light source is uniform and the light emitting intensity is stable.

However, the light emitting intensity distribution of an LED or a laser diode (LD) that is a semiconductor light emitting element is a Gaussian distribution. Furthermore, each semiconductor light emitting element has a variability of the light emitting intensity due to the influence of a production error, a structural defect, temperature fluctuation, or the like. Therefore, even in the illumination optical systems disclosed in Japanese Patent No. 3987350, Japanese Patent Laid-Open No. 2002-184206, and Japanese Patent Laid-Open No. 2004-220016, it is actually difficult to uniformly illuminate the plane to be illuminated.

For example, as disclosed in Japanese Patent No. 3987350 and Japanese Patent Laid-Open No. 2002-184206, when a light beam from each light emitting section enters one lens cell without being divided, the Gaussian distribution can not be corrected. Therefore, although a uniform illumination is performed by overlapping Gaussian distribution light beams from a plurality of light emitting sections with a shift from each other on a plane to be illuminated, a high accurate adjustment is necessary for uniformizing the illumination at a joint section of light beams from a plurality of light emitting sections.

When there is a variability of light emitting intensity among a plurality of light emitting sections, local illuminance unevenness is generated on a plane to be illuminated because each of a plurality of light beams from the plurality of light emitting sections illuminates a different region on the plane to be illuminated.

It is also important for an illumination optical system installed in an image projection apparatus to be miniaturized. Like an illumination optical system disclosed in Japanese Patent Laid-Open No. 2004-220016, the influence of the variability of the light emitting intensity distribution of each light emitting section or the light emitting intensity among a plurality of light emitting sections can be reduced by dividing a plurality of light beams from a plurality of light emitting sections of the array light source by a plurality of lens cells. However, in an illumination optical system disclosed in Japanese Patent Laid-Open No. 2004-220016, the illumination optical system grows in size in an array direction of the light emitting sections because a divergent light from each light emitting section is paralleled by a parallel element corresponding to each light emitting section of the array light source to enter a fly-eye lens.

BRIEF SUMMARY OF THE INVENTION

The present invention provides a small illumination optical system which has a light source including a plurality of light emitting sections and is configured to be able to uniformly illuminate a plane to be illuminated by reducing the influence of the variability of the light emitting intensity distribution of each light emitting section or the light emitting intensity among a plurality of light emitting sections.

An illumination optical system as one aspect of the present invention includes a light source which includes a plurality of light emitting sections arrayed in a specific direction, and an integrator which includes a plurality of lens cells arrayed in the specific direction. The illumination optical system illuminates a plane to be illuminated by a light beam emitted from the plurality of light emitting sections and passing through the integrator. A plurality of light beams from the plurality of light emitting sections enter an incident surface of the integrator with a shift from each other in the specific direction, as divergent light beams, each of which spreads in the specific direction. Two light beams from two light emitting sections adjacent to each other among the plurality of light emitting sections are overlapped with each other in a region larger than one of the lens cells on the incident surface of the integrator.

An image projection apparatus as another aspect of the present invention includes the illumination optical system, a spatial light modulation element which is arranged on the plane to be illuminated, and a projection optical system which is configured to project light from the spatial light modulation element onto a plane to be projected.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
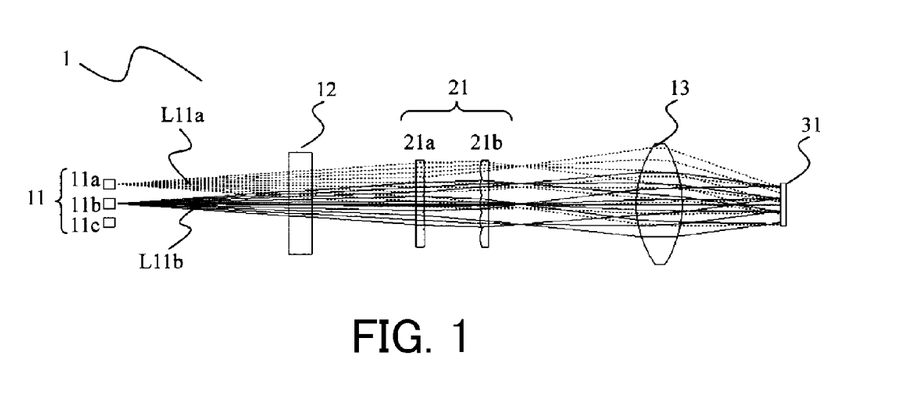
FIG. 1 is a top plan cross-sectional view of an illumination optical system that is embodiment 1 of the present invention.
Figure 2:
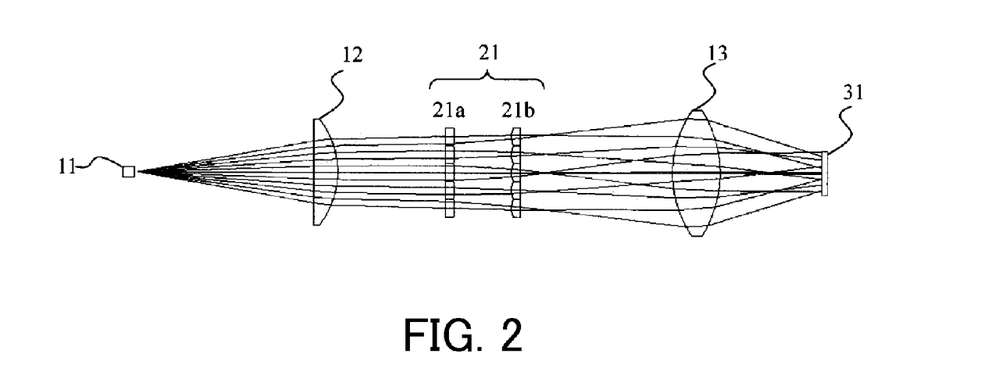
FIG. 2 is a side plan cross-sectional view of an illumination optical system of embodiment 1.

FIGS. 1 and 2 show a configuration of an illumination optical system 1 that is embodiment 1 of the present invention. FIG. 1 shows a cross section from a top plane (first cross section) of the illumination optical system 1, and FIG. 2 shows a cross section from a side plane (second cross section) which is orthogonal to the cross section shown in FIG. 1.

In these drawings, reference numeral 11 denotes an array light source including a plurality of (three in the present embodiment) laser diodes (hereinafter referred to as "LDs") 11a, 11b, and 11c as light emitting sections, each of which emits a light beam having a shape of elliptic cross section. The three LDs 11a, 11b, and 11c are arrayed in a specific direction that is an upward and downward direction in FIG. 1 (a direction perpendicular to a paper plane of FIG. 2). Hereinafter, the specific direction is referred to as an LD array direction. The LDs 11a and 11b are two light emitting sections adjacent to each other in the LD array direction (the first cross section), and the LDs 11b and 11c are also two light emitting sections adjacent to each other in the LD array direction. A short axis direction of the elliptic cross section of the light beam from each LD corresponds to the LD array direction.

The plurality of LDs provided in the array light source 11 may emit lights that have the same color or may emit lights that have a color such as R, G, or B different from one another. This is also true for other embodiments described later.

Reference numeral 12 denotes a cylinder lens, and reference numeral 21 denotes an integrator. The integrator 21 is constituted by a first fly-eye lens (a first lens array) 21a and a second fly-eye lens (a second lens array) 21b which are arranged in sequence from the light source side. Reference numeral 13 denotes a condenser lens (a superimposing optical system) 13 which superimposes a plurality of light beams from the integrator 21 on a plane to be illuminated 31.

First, referring to FIG. 1, an optical action in the LD array direction in the illumination optical system 1 will be described. A divergent light beam is emitted from each of the LDs 11a, 11b, and 11c. FIG. 1 shows only light beams L11a and L11b emitted from the LDs 11a and 11b, and a light beam emitted from the LD 11c is omitted.

The light beams L11a and L11b as divergent light beams transmit the cylinder lens 12 with a light beam diameter enlarged and enter an incident surface of the first fly-eye lens 21a. A ray which proceeds in a direction indicating the strongest intensity among lays constituting each divergent light beam is referred to as a principal ray, and the principal ray perpendicularly enters the incident surface of the first fly-eye lens 21a. Each of the divergent light beams enters the incident surface of the first fly-eye lens 21a with a shift from each other in the LD array direction.

Each light beam entered the first fly-eye lens 21a is divided into a plurality of light beams by a plurality of lens cells constituting the first fly-eye lens 21a, each of which has a shape of a rectangular opening. Thus, the light emitting intensity distribution of each LD is decentralized. The plurality of lens cells of the first fly-eye lens 21a are arrayed in the LD array direction and a direction orthogonal to the LD direction.

Figure 3:
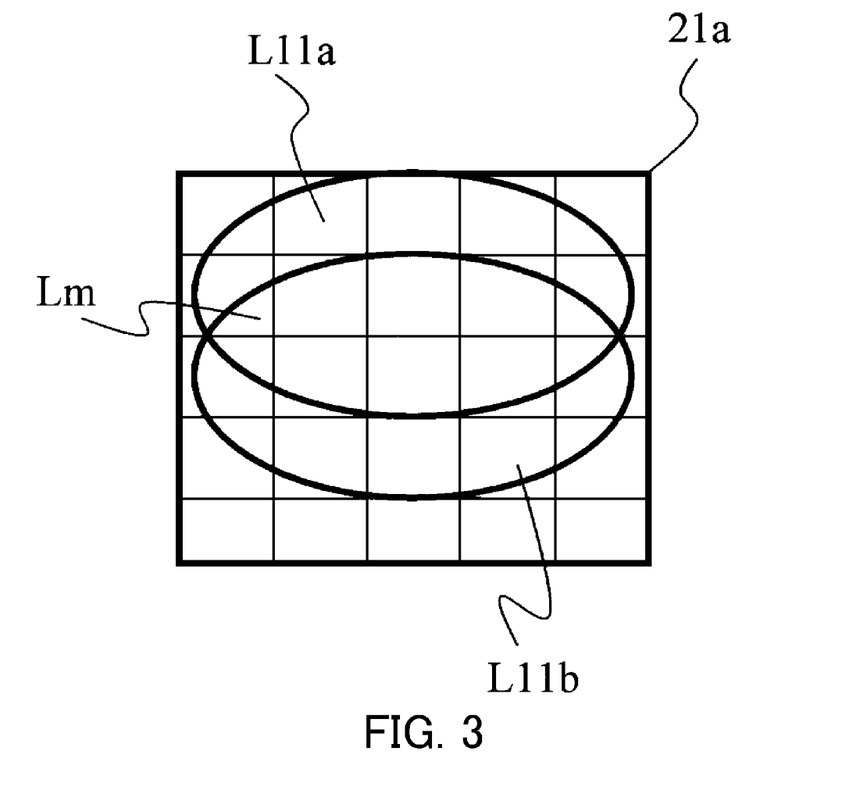
FIG. 3 is a view showing a light beam distribution on an integrator incident surface in embodiment 1.

Parts of each of the light beams L11a and L11b as divergent light beams entered the incident surface of the first fly-eye lens 21a are overlapped with each other in a region Lm shown in FIG. 3 (hereinafter, referred to as an "overlap region") in an LD array direction. FIG. 3 shows a cross section orthogonal to the first and second cross sections of the light beams L11a and L11b on the incident surface of the first fly-eye lens 21a. The overlap region Lm is a region that is larger than one lens cell of the first fly-eye lens 21a. In other words, a width of the overlap region Lm in the LD array direction (and a direction orthogonal to the LD array direction) is lager than that in the same direction of one lens cell described above.

The principal ray of the divergent light beam from the LD 11c transmitted through the cylinder lens 12 also perpendicularly enters the incident surface of the first fly-eye lens 21a. A part of the divergent light beam from the LD 11c is overlapped with a part of the light beam L11b as a divergent light beam on a region larger than one lens cell on the incident surface of the first fly-eye lens 21a.

In the present embodiment, as described above, the divergent light beam from each LD is guided to the incident surface of the first fly-eye lens 21a so that its principal ray perpendicularly enters the incident surface of the first fly-eye lens 21a, i.e. without deflecting the divergent light beam. Thus, a divergent angle of the divergent light beam entering the integrator 21 can be suppressed with easy configuration, and as a result, the total length of the illumination optical system 1 can be shortened.

A plurality of light beams emitted from the first fly-eye lens 21a enter the second fly-eye lens 21b. The second fly-eye lens 21b includes a plurality of condenser lens cells having a rectangular opening shape, each of which is arranged so as to correspond to a respective one of the plurality of lens cells of the first fly-eye lens 21a. The light beam from each lens cell of the first fly-eye lens 21a enters a condenser lens cell which corresponds to the lens cell (which is a counterpart of the lens cell) of the first fly-eye lens 21a in the second fly-eye lens 21b. A plurality of lens cells of the second fly-eye lens 21b are also arrayed in the LD array direction and the direction orthogonal to the LD array direction.

A plurality of light beams emitted from the second fly-eye lens 21b are overlapped with each other on the plane to be illuminated 31 by the condenser lens 13. Thus, the plane to be illuminated 31 is illuminated with uniform illumination in the LD array direction.

Hereinafter, the optical action of the illumination optical system 1 for each LD will be described in more detail. As described above, the light beam emitted from each LD is guided to the incident surface of the first fly-eye lens 21a as a divergent light beam. Therefore, as shown in FIG. 3, a diameter of the divergent light beam, in the LD array direction, reached the incident surface of the first fly-eye lens 21a (a width in a short axis direction) is enlarged compared with that at the time of being emitted from each LD. Therefore, the first fly-eye lens 21a is divided into a plurality of light beams by a plurality of lens cells also in the LD array direction where the width of the light beam is narrow.

Thus, even if the light emitting intensity distribution of each LD shows a Gaussian distribution, the light emitting intensity distribution can be adequately decentralized, and the plane to be illuminated 31 can be uniformly illuminated by only one light beam from each LD. Therefore, even if there is a variability of the light emitting intensity among the LDs 11a, 11b, and 11c, local illuminance unevenness on the plane to be illuminated 31 is not practically generated.

Furthermore, since the diameter of the divergent light beam in the LD array direction is enlarged, as shown in FIG. 3, the overlap region Lm can be formed on the incident surface of the first fly-eye lens 21a for the light beams L11a and L11b from the LD 11a and 11b adjacent to each other in the LD array direction. The overlap region Lm is a region that is formed by an effective light beam component (for example, a light beam component that has intensity between the maximum intensity and $1/e^2$ of the maximum intensity) in the light beams L11a and L11b.

As described above, the overlap region Lm is a region that is larger than one lens cell of the first fly-eye lens 21a. Therefore, at least one lens cell of the first fly-eye lens 21a can be shared by light beams L11a and L11b from the LDs 11a and 11b adjacent to each other. Thus, the number of lens cells in the LD array direction necessary for the LDs 11a, 11b, and 11c can be reduced, and as a result, the illumination optical system 1 can be miniaturized in the LD array direction.

Next, referring to FIG. 2, an optical action of the illumination optical system 1 in a direction (second cross section) orthogonal to the LD array direction will be described. The divergent light beam from each LD is converted into a parallel light beam by the cylinder lens 12 to enter the first fly-eye lens 21a. Each light beam entered the first fly-eye lens 21a as a parallel light beam with a diameter of the light beam enlarged is divided into a plurality of light beams by a plurality of lens cells of the first fly-eye lens 21a. Thus, similarly to the case in the LD array direction, the light emitting intensity distribution of each LD is decentralized.

Furthermore, a plurality of light beams emitted from the first fly-eye lens 21a are overlapped with each other on the plane to be illuminated 31 by a plurality of condenser lens cells of the second fly-eye lens 21b and the condenser lens 13. Thus, the plane to be illuminated 31 is illuminated with uniform illumination also in a direction orthogonal to the LD array direction.

Next, in the illumination optical system 1 of the present embodiment, a condition to be preferably satisfied for the miniaturization and the improvement of light incoming efficiency on the plane to be illuminated 31 will be described. If the characteristics of the illumination optical system 1 described above is satisfied, the following condition does not have to be satisfied.

An interval of the three LDs 11a, 11b, and 11c of the array light source 11 in the LD array direction is defined as $P_1$, and a distance between the array light source 11 and the incident surface of the first fly-eye lens 21a (integrator 21) is defined as $L_1$. A divergent angle of the divergent light beam entering the incident surface of the first fly-eye lens 21a (integrator 21) is defined as $\sigma$, and an interval (cell interval) between a plurality of lens cells of the first fly-eye lens 21a in the LD array direction is defined as $P_2$. Further, a distance between a first lens cell in the first fly-eye lens 21a and a second lens cell which is a counterpart of the first lens cell in the second fly-eye lens 21b is defined as $L_2$. In this case, the following conditions are preferably satisfied.

$$(2L_1 \tan \sigma - P_1)/P_2 > 1$$

$$(P_2/2L_2)/\tan \sigma > 0.8$$

The divergent angle $\sigma$ is an angle where the light emitting intensity is $1/e^2$ of the maximum intensity when the light emitting intensity distribution of each LD indicates a Gaussian distribution, so-called a half-value width ($1/e^2$ width in a description of a typical laser divergent angle).

The interval $P_1$ is a central interval of the light emitting region of the LDs adjacent to each other in the LD array direction. The cell interval $P_2$ is a central interval of the lens cells adjacent to each other in the LD array direction.

When condition 1 is satisfied, on the incident surface of the integrator 21 (the first fly-eye lens 21a), the two light beams from the two LDs adjacent to each other in the LD array direction can be overlapped with each other on a region larger than one lens cell of the integrator 21. Thus, as described above, at least one lens cell can be shared by the two light beams described above, and the illumination optical system 1 can be miniaturized in the LD array direction. When the condition 1 is not satisfied, the region sharing the lens cell is small and the illumination optical system 1 may not be adequately miniaturized.

When condition 2 is satisfied, an intake efficiency of the light beam to the lens cells that are counterparts of each other in the first and second fly-eye lenses 21a and 21b can be increased. In other words, the light incoming efficiency from the array light source 11 onto the plane to be illuminated 31 can be improved, and the plane to be illuminate 31 can be brightly illuminated with respect to an emitted light intensity from the array light source 11. When condition 2 is not satisfied, the light incoming efficiency from the array light source 11 to the plane to be illuminated 31 is decreased, and the plane to be illuminated 31 may not be able to be brightly illuminated if the emitted light intensity from the array light source 11 is not increased.

The inventor performed an experiment (simulation) on conditions that $P_1$ is equal to 4 mm, $L_1$ is equal to 52 mm, $\sigma$ is equal to 5 degrees, $P_2$ is equal to 3.6 mm, and $L_2$ is equal to 10 mm, and obtained a good result. In this case, the following expressions are satisfied and both of conditions 1 and 2 are satisfied.

$(2L_1 \tan \sigma - P_1)/P_2 = 1.42 > 1$ $(P_2/2L_2)/\tan \sigma = 2.05 > 0.8$

Both conditions 1 and 2 do not have to be satisfied at the same time, but the case where one of the conditions is satisfied may also be acceptable.

According to the present embodiment, in a case where the array light source 11 including a plurality of LDs is used, the influence of the variability of the light emitting intensity distribution of each LD for the uniform illumination on the plane to be illuminated 31 or the light emitting intensity among a plurality of LDs can be reduced, and the illumination optical system 1 which is small and has a high light use efficiency can be realized.

Embodiment 2

Figure 4:
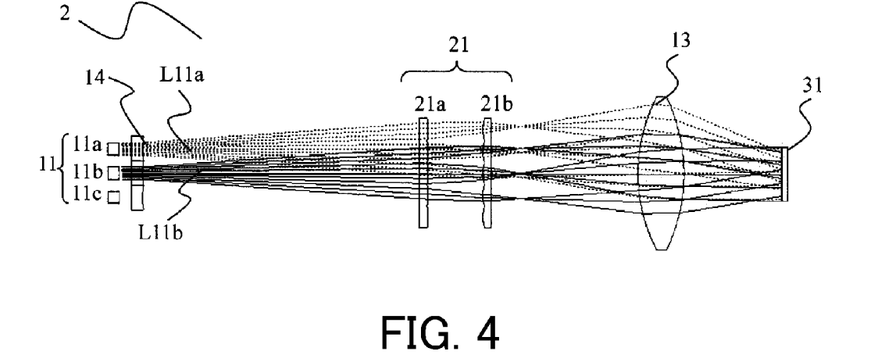
FIG. 4 is a top plan cross-sectional view of an illumination optical system that is embodiment 2 of the present invention.
Figure 5:
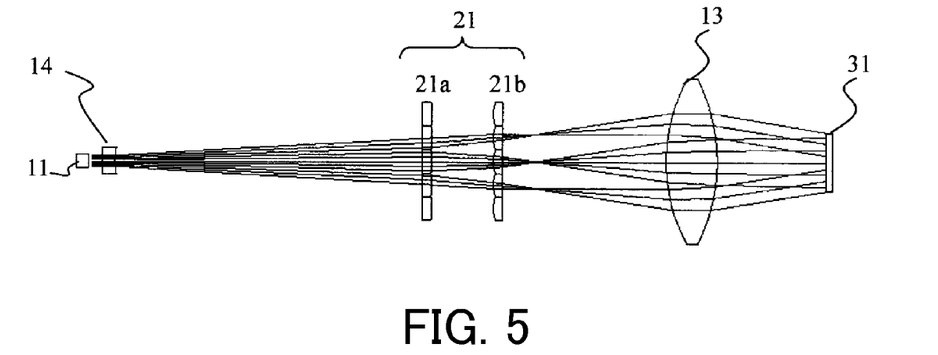
FIG. 5 is a side plan cross-sectional view of an illumination optical system of embodiment 2.

FIGS. 4 and 5 show a configuration of an illumination optical system 2 that is embodiment 2 of the present invention. FIG. 4 shows a cross section from a top plane (first cross section) of the illumination optical system 2, and FIG. 5 shows a cross section from a side plane (second cross section) which is orthogonal to the cross section shown in FIG. 4.

In these drawings, the same configuration elements common to those shown in embodiment 1 (FIGS. 1 and 2) will be denoted by the same reference numerals as those of embodiment 1 and the duplicate descriptions thereof will be omitted.

However, in the present embodiment, a parallel light beam that has a circular cross section is emitted from each of the LDs 11a, 11b, and 11c included in the array light source 11. A divergent angle control element 14 which controls a divergent angle of the light beam from each LD is arranged between the array light source 11 and the integrator 21. A cylinder lens 12 shown in embodiment 1 is not used in the present embodiment.

First, referring to FIG. 4, an optical action of the illumination optical system 2 in an LD array direction will be described. As described above, the parallel light beam is emitted from each of the LDs 11a, 11b, and 11c. In FIG. 4, only light beams L11a and L11b emitted from the LDs 11a and 11b respectively are shown, and light beam emitted from the LD 11c is omitted.

The light beams L11a and L11b as parallel light beams are converted into divergent light beams having a circular cross section by the divergent angle control element 14 which has three lenses corresponding to the three LDs. The selection freedom of the light source to be used and the design freedom of the illumination optical system 2 can be improved by arranging the divergent angle control element 14, and the illumination optical system 2 which is capable of uniformly illuminating a plane to be illuminated 31 can be realized even if it has a smaller size.

The light beams L11a and L11b converted into the divergent light beams enter the incident surface of the first fly-eye lens 21a while diameters of the light beams are enlarged. The light beams L11a and L11b and the light beam from the LD 11c enter the incident surface of the first fly-eye lens 21a with a shift from each other in the LD array direction.

Principal rays of the divergent light beams L11a and L11b perpendicularly enter the incident surface of the first fly-eye lens 21a. A principal ray of the light beam emitted from the LD 11c and converted into the divergent light beam by the light beam divergent angle control element 14 also perpendicularly enters the incident surface of the first fly-eye lens 21a. Thus, similarly to embodiment 1, the divergent angle of the divergent light beam entering the integrator 21 can be suppressed with simple configuration, and as a result, the total length of the illumination optical system 2 can be shortened.

Each divergent light beam entered the first fly-eye lens 21a with the diameter of the light beam enlarged is divided into a plurality of light beams by a plurality of lens cells, each of which has a rectangular opening shape, constituting the first fly-eye lens 21a. Thus, the light emitting intensity distribution of each LD is decentralized, and the light emitting intensity distribution of each LD can be adequately decentralized even if the light emitting intensity distribution of the LD is a Gaussian distribution. In other words, the plane to be illuminated 31 can also be uniformly illuminated by only one light beam from each LD. Therefore, even if there is a variability of the light emitting intensity among the LDs 11a, 11b, and 11c, local illuminance unevenness on the plane to be illuminated 31 is not practically generated.

Figure 6:
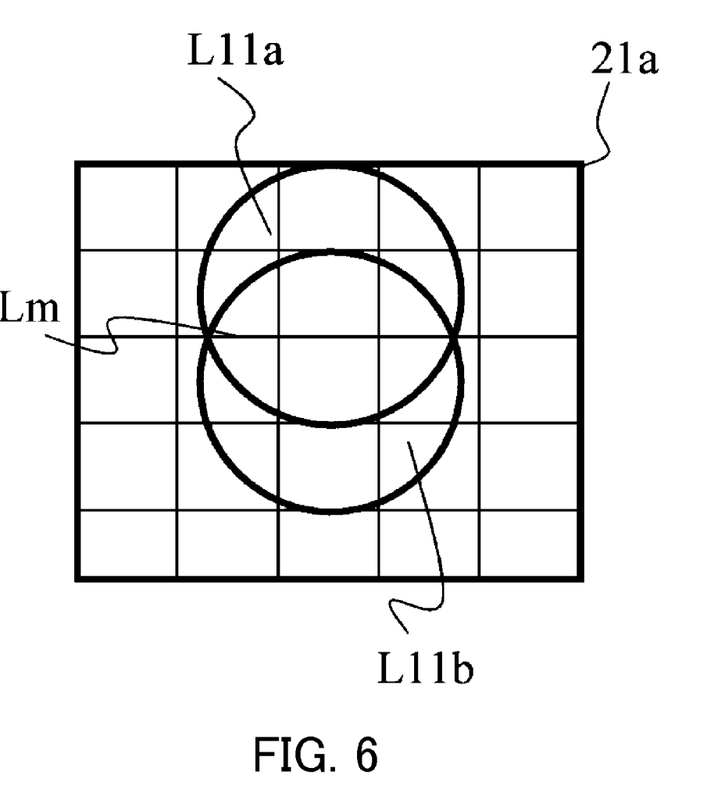
FIG. 6 is a view showing a light beam distribution on an integrator incident surface in embodiment 2.

Parts of each of the light beams L11a and L11b as divergent light beams entered the incident surface of the first fly-eye lens 21a are overlapped with each other on a region Lm shown in FIG. 6 (hereinafter, referred to as an overlap region) in the LD array direction. FIG. 6 shows a cross section orthogonal to the first and second cross sections of the light beams L11a and L11b on the incident surface of the first fly-eye lens 21a. The overlap region Lm is a region larger than one lens cell of the first fly-eye lens 21a. In other words, a width of the overlap region Lm in the LD array direction (and a direction orthogonal to the LD array direction) is larger than that of one lens cell described above in the same direction.

A part of the light beam emitted from the LD 11c and converted into the divergent light beam by the light beam divergent angle control element 14 is overlapped with a part of the light beam L11b as a divergent light beam on a region larger than one lens cell on the incident surface of the first fly-eye lens 21a.

Thus, similarly to embodiment 1, the miniaturization of the illumination optical system 2 in the LD array direction can be realized.

A plurality of light beams emitted from a plurality of lens cells of the first fly-eye lens 21a enter a plurality of condenser lens cells which are counterparts of the plurality of lens cells of the first fly-eye lens 21a on the second fly-eye lens 21b.

A plurality of light beams emitted from the second fly-eye lens 21b are overlapped with each other on the plane to be illuminated 31 by the condenser lens 13. Thus, the plane to be illuminated 31 is illuminated with uniform illumination in the LD array direction.

Next, referring to FIG. 5, an optical action of the illumination optical system 2 in a direction orthogonal to the LD array direction (second cross section) will be described. A parallel light from each LD is converted into a divergent light beam by the divergent angle control element 14 to enter the first fly-eye lens 21a. Each divergent light beam entered the first fly-eye lens 21a with the diameter of the light beam enlarged is divided into a plurality of light beams by a plurality of lens cells of the first fly-eye lens 21a. Thus, similarly to the LD array direction, the light emitting intensity distribution of each LD can be decentralized.

Further, a plurality of light beams emitted from the first fly-eye lens 21a are overlapped with each other on the plane to be illuminated 31 by a plurality of condenser lens cells of the second fly-eye lens 21b and the condenser lens 13. Thus, the plane to be illuminated 31 is illuminated with uniform illumination also in a direction orthogonal to the LD array direction.

Also in the present embodiment, in order to miniaturize the illumination optical system 2 and improve the light incoming efficiency on the plane to be illuminated 31, at least one of conditions 1 and 2 described in embodiment 1 is preferably satisfied.

The inventor performed an experiment (simulation) on conditions that $P_1$ is equal to 4 mm, $L_1$ is equal to 52 mm, $\sigma$ is equal to 4.5 degrees, $P_2$ is equal to 3.6 mm, and $L_2$ is equal to 10 mm, and obtained a good result. In this case, the following expressions are satisfied and both of conditions 1 and 2 are satisfied.

$$(2L_1 \tan \sigma - P_1)/P_2 = 1.16 > 1$$

$$(P_2/2L_2)/\tan \sigma = 2.28 > 0.8$$

According to the present embodiment, in a case where the array light source 11 including a plurality of LDs which emit a parallel light beam is used, the influence of the variability of the light emitting intensity distribution of each LD for the uniform illumination on the plane to be illuminated 31 or the light emitting intensity among a plurality of LDs can be reduced. Furthermore, the illumination optical system 2 which is small and has high light use efficiency can be realized.

Embodiment 3

Figure 7:
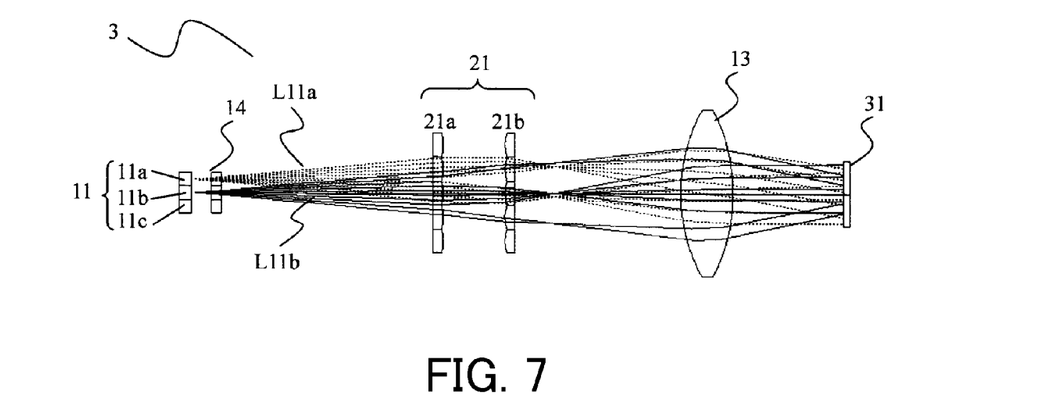
FIG. 7 is a top plan cross-sectional view of an illumination optical system that is embodiment 3 of the present invention.
Figure 8:
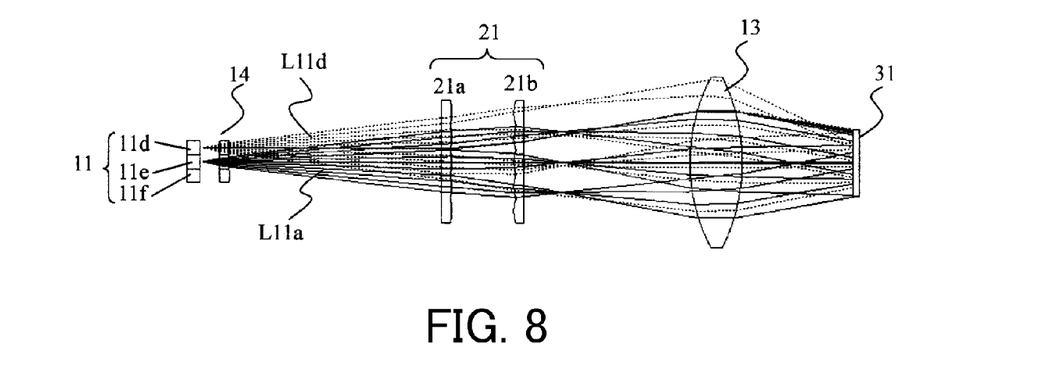
FIG. 8 is a side plan cross-sectional view of an illumination optical system of embodiment 3.

FIGS. 7 and 8 show a configuration of an illumination optical system 3 that is embodiment 3 of the present invention. FIG. 7 shows a cross section from a top plane (first cross section) of the illumination optical system 3, and FIG. 8 shows a cross section from a side plane (second cross section) which is orthogonal to the cross section shown in FIG. 7.

In these drawings, the same configuration elements common to those shown in embodiment 2 will be denoted by the same reference numerals as those of embodiment 2 and the duplicate descriptions thereof will be omitted.

In the present embodiment, nine (3×3) LDs including the LDs 11a, 11b, 11c, 11d, 11e, and 11f are two-dimensionally arrayed. A divergent light beam having an elliptic shape cross section is emitted from each LD. Hereinafter, an array direction of the LDs 11a, 11b, and 11c is referred to as a first LD array direction, and an array direction of the LDs 11d, 11e, and 11f is referred to as a second LD array direction. A short axis direction of the elliptic cross section of the light beam from each LD corresponds to the first LD array direction.

First, referring to FIG. 7, an optical action of the illumination optical system 3 in the first LD array direction will be described. As described above, a divergent light beam is emitted from each of the LDs 11a, 11b, and 11c and other six LDs arrayed in the same direction as that of the LDs 11a, 11b, and 11c. FIG. 7 shows only light beams L11a and L11b emitted from the LDs 11a and 11b, and light beams emitted from other LDs are omitted.

The light beams L11a and L11b as divergent light beams transmit the divergent angle control element 14 which has nine lenses corresponding to the respective nine LDs, and enter the incident surface of the first fly-eye lens 21a while the diameter of the light beams are enlarged. The light beams from all LDs including the light beams L11a and L11b enter the incident surface of the first fly-eye lens 21a with a shift from each other in the first LD array direction.

Principal rays of the light beams L11a and L11b perpendicularly enter the incident surface of the first fly-eye lens 21a. Principal rays of divergent light beams emitted from LDs other than the LDs 11a and 11b and transmitted through the light beam divergent angle control element 14 also perpendicularly enter the incident surface of the first fly-eye lens 21a. Thus, similarly to embodiment 1, the divergent angle of the divergent light beam entering the integrator 21 can be suppressed with easy configuration, and as a result, the total length of the illumination optical system 3 can be shortened.

Each divergent light beam entered the first fly-eye lens 21a with the diameter of the light beam enlarged is divided into a plurality of light beams by a plurality of lens cells, each of which has a rectangular opening shape, constituting the first fly-eye lens 21a. Thus, the light emitting intensity distribution of each LD is decentralized, and the light emitting intensity distribution of each LD can be adequately decentralized even if the light emitting intensity distribution of the LD is a Gaussian distribution. In other words, the plane to be illuminated 31 can also be uniformly illuminated by only one light beam from each LD. Therefore, even if there is a variability of the light emitting intensity among the LDs, local illuminance unevenness on the plane to be illuminated 31 is not practically generated.

Figure 9:
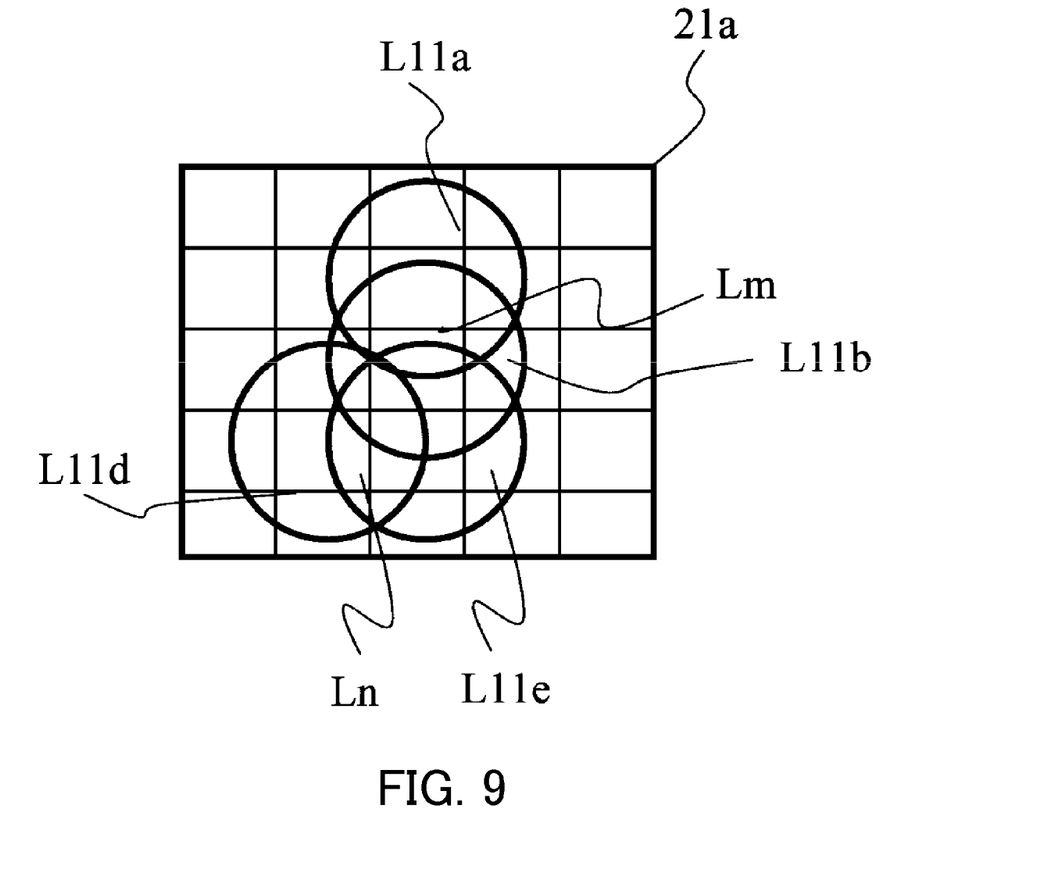
FIG. 9 is a view showing a light beam distribution on an integrator incident surface in embodiment 3.

Parts of each of the light beams L11a and L11b as divergent light beams entered the incident surface of the first fly-eye lens 21a are overlapped with each other on a region Lm shown in FIG. 9 (hereinafter, referred to as an "overlap region") in the first LD array direction. FIG. 9 shows a cross section orthogonal to the first and second cross sections of the light beams L11a and L11b on the incident surface of the first fly-eye lens 21a. The overlap region Lm is a region that is larger than one lens cell of the first fly-eye lens 21a. In other words, a width of the overlap region Lm in the first LD array direction is larger than one lens cell described above in the same direction.

Parts of each of two divergent light beams emitted from two LDs adjacent to each other in the first LD array direction among LDs other than the LDs 11a and 11b and transmitted through the light beam divergent angle control element 14 are overlapped with each other on a region larger than one lens cell on the incident surface of the first fly-eye lens 21a.

Thus, similarly to embodiment 1, the illumination optical system 3 can be miniaturized in the first LD array direction.

A plurality of light beams emitted from a plurality of lens cells of the first fly-eye lens 21a enter a plurality of condenser lens cells which are counterparts of a plurality of lens cells of the first fly-eye lens 21a in the second fly-eye lens 21b.

A plurality of light beams emitted from the second fly-eye lens 21b are overlapped with each other on the plane to be illuminated 31 by the condenser lens 13. Thus, the plane to be illuminated 31 is uniformly illuminated in the first LD array direction.

Next, referring to FIG. 8, an optical action of the illumination optical system 3 in the second LD array direction (second cross section) will be described. The divergent angles of the divergent light beams from the LDs 11d, 11e, and 11f and other LDs arrayed in the same direction as that of the LDs 11d, 11e, and 11f are narrowed by the divergent angle control element 14 which controls the divergent angles, and the divergent light beams are converted into those that have circular shape cross sections. FIG. 8 shows only light beams L11d and L11e emitted from the LDs 11d and 11e and light beams emitted from other LDs are omitted.

The light beams L11d and L11e as divergent light beams transmit the divergent angle control element 14 and enter the incident surface of the first fly-eye lens 21a while the diameters of the light beams are enlarged. Furthermore, light beams from all LDs including the light beams L11d and L11e enter the incident surface of the first fly-eye lens 21a with a shift from each other in the second LD array direction.

Principal rays of the light beams L11d and L11e perpendicularly enter the incident surface of the first fly-eye lens 21a. Principal rays of the divergent light beams emitted from LDs other than the LDs 11d and 11e and transmitted through the light beam divergent angle control element 14 also perpendicularly enter the incident surface of the first fly-eye lens 21a. Thus, the same effect as that described in the case of the first LD array direction can be obtained.

Each divergent light beam entered the first fly-eye lens 21a with the diameter of the light beam enlarged is divided into a plurality of light beams by a plurality of lens cells, each of which has a rectangular opening shape, constituting the first fly-eye lens 21a. Thus, the same effect as that described in the case of the first LD array direction can be obtained.

Parts of each of the light beams L11d and L11e as divergent light beams entered the incident surface of the first fly-eye lens 21a are overlapped with each other on a region Ln shown in FIG. 9 (hereinafter, referred to as an "overlap region") in the second LD array direction. The overlap region Ln is a region larger than one lens cell of the first fly-eye lens 21a. In other words, a width of the overlap region Ln in the second LD array direction is larger than that of one lens cell described above in the same direction.

Parts of each of two divergent light beams emitted from two LDs adjacent to each other in the second LD array direction among LDs other than the LDs 11d and 11e and transmitted through the light beam divergent angle control element 14 are overlapped with each other on a region larger than one lens cell on the incident surface of the first fly-eye lens 21a.

Thus, also in the second LD array direction, the illumination optical system 3 can be miniaturized.

A plurality of light beams emitted from the first fly-eye lens 21a are overlapped with each other on the plane to be illuminated 31 by a plurality of condenser lens cells of the second fly-eye lens 21b and a condenser lens 13. Thus, the plane to be illuminated 31 is uniformly illuminated also in the second LD array direction.

Also in the present embodiment, in order to miniaturize the illumination optical system 3 and improve the light incoming efficiency on the plane to be illuminated 31, at least one of conditions 1 and 2 described in embodiment 1 is preferably satisfied.

The inventor performed an experiment (simulation) on conditions that P1 is equal to 2 mm, L1 is equal to 37 mm, σ is equal to 5 degrees, P2 is equal to 3.6 mm, and L2 is equal to 10 mm, and obtained a good result. In this case, the following expressions are satisfied and both conditions 1 and 2 are satisfied.

$$(2L1 \tan \sigma - P1)/P2 = 1.8 > 1$$

$$(P2/2L2)/\tan \sigma = 1.58 > 0.8$$

According to the present embodiment, in a case where the array light source 11 including a plurality of LDs which are two-dimensionally arrayed, the influence of the variability of the light emitting intensity distribution of each LD for the uniform illumination on the plane to be illuminated 31 or the light emitting intensity among a plurality of LDs can be reduced. Furthermore, the illumination optical system 3 which is small and has high light use efficiency can be realized.

Embodiment 4

Figure 10:
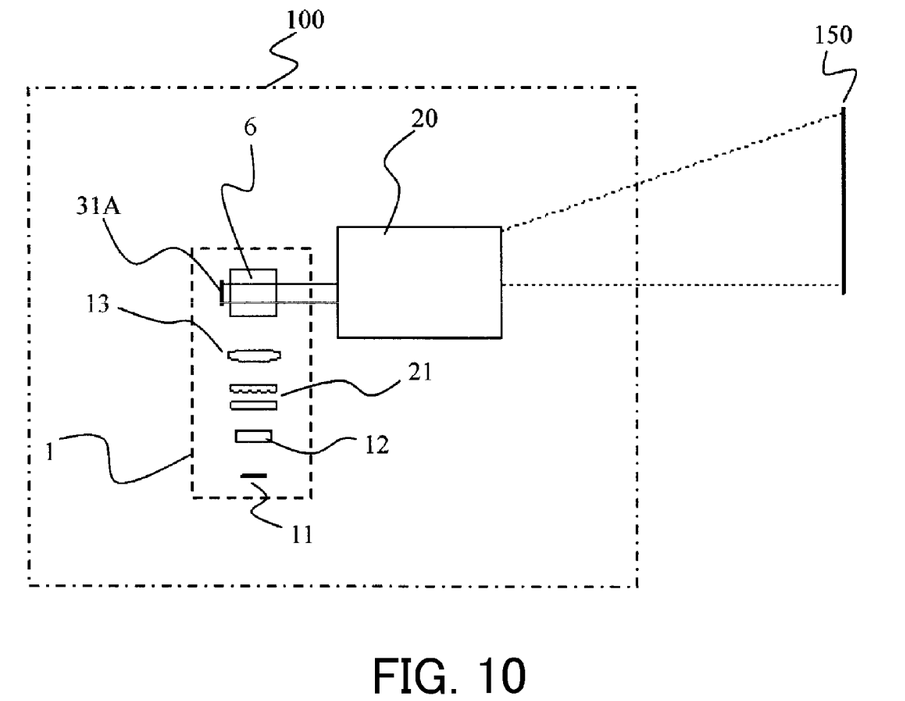
FIG. 10 is a view showing a configuration of a projector that is embodiment 4 of the present invention.

FIG. 10 shows a configuration of a reflective liquid crystal projector 100 as an image projection apparatus that is embodiment 4 of the present invention.

The projector 100 has an illumination optical system 1 shown in embodiment 1, a reflective liquid crystal panel 31A as a spatial light modulation element which is arranged on a plane to be illuminated 31, and a projection optical system 20 which performs an extended projection of light modulated by the reflective liquid crystal panel 31A onto a screen (plane to be projected) 150. In the embodiment, a projector using the illumination optical system 1 shown in embodiment 1 will be described, but the illumination optical system 2 or 3 shown in embodiment 2 or 3, respectively, may be used instead of the illumination optical system 1.

The array light source 11 has three LDs which emit R (Red) light ($\lambda$=640 nm), G (Green) light ($\lambda$=550 nm), and B (Blue) light ($\lambda$=450 nm), respectively. Each of R, G, and B lights from the array light source 11 transmits through the cylinder lens 12 and is divided into a plurality of light beams by the integrator 21. The plurality of light beams are condensed by the condenser lens 13 to be overlapped with each other on the liquid crystal panel 31A via a polarization beam splitter 6.

The polarization beam splitter 6 has a polarization separation film (not shown) inside it. The polarization separation film is formed by a multilayer film, and it transmits P-polarized light and reflects S-polarized light.

The three LDs of the array light source 11 emit the R, G, and B lights, respectively, as S-polarized light for the polarization beam splitter 6. When the LD emits non-polarized light, a polarization conversion element which converts the non-polarized light into the S-polarized light may be arranged in the illumination optical system 1 (for example, immediately after the first fly-eye lens 21a).

The liquid crystal panel 31A is connected to a drive circuit (not shown). The drive circuit inputs an image signal from an image supply apparatus such as a personal computer, a DVD player, a videocassette recorder, or a television tuner. An image display system is constituted by the projector and the image supply apparatus.

The drive circuit drives the liquid crystal panel 31A so that original images for R, G, and B are formed sequentially by a time division, based on R, G, and B components of the inputted image signals. Thus, the liquid crystal panel 31A modulates as well as reflects the R, G, and B lights to emit them as R, G, and B image lights (modulated lights).

The R, G, and B image lights from the liquid crystal panel 31A enter the polarization beam splitter 6 as P-polarized light, and transmit the polarization separation film to be projected onto the screen 150 by the projection optical system 20.

The R, G, and B images sequentially projected onto the screen 150 are switched with high speed on condition that a lighting LD among the three LDs of the array light source 11 and the original image formed on the liquid crystal panel 31A among original images for R, G, and B are synchronized and are switched with high speed. A color image is recognized on the screen 150 by a residual image effect of human vision.

Although the present embodiment has described the case where a reflective liquid crystal panel is used as a spatial light modulation element, other spatial light modulation element such as a transmissive liquid crystal panel or a DMD (a Digital Micromirror Device) may also be used. Although the present embodiment has described a single panel projector, a multi-panel projector such as a three-panel projector can also be constituted by using at least one of the illumination optical systems 1 through 3 described in embodiments 1 through 3, respectively. Furthermore, the emission color of the LD is not limited to R, G, and B, but other emission colors may also be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, embodiments 1 through 3 have described the case where an integrator constituted by a fly-eye lens is used. However, an integrator constituted by another optical element having a function that divides light beam such as a cylinder lens array, a lenticular lens array, a diffractive grating, or a hologram element may also be used.

Embodiments 1 through 3 have described the case where the number of LDs included in the array light source is three or nine, but the number of the LDs is not limited to it. Further, the array of the LDs is not limited to the regular array, but a random LD array may also be adopted.

As a light source, instead of the LD, an LED can also be used.

This application claims the benefit of Japanese Patent Application No. 2008-211103, filed on Aug. 19, 2008, which is hereby incorporated by reference herein in its entirety.

What is claimed is:

1. An illumination optical system, comprising:
a light source which includes a plurality of light emitting sections arrayed in a specific direction;
an integrator which includes a plurality of lens cells arrayed in the specific direction, wherein the integrator has a first lens array and a second lens array, the first lens array including a first plurality of lens cells, the second lens array including a second plurality of lens cells, each lens cell included in the first lens array and each lens cell included in the second lens array being provided so as to be counterpart to each other; and
an overlapping optical system configured to overlap, on a plane to be illuminated, a plurality of light beams emitted from the light source and passed through the integrator,
wherein the illumination optical system illuminates the plane to be illuminated with a light beam emitted from each of the plurality of light emitting sections and passing through the integrator and the overlapping optical system,
wherein a plurality of light beams from the plurality of light emitting sections enter an incident surface of the integrator with a shift from each other in the specific direction, as divergent light beams in the specific direction, and
wherein two light beams from two light emitting sections adjacent to each other among the plurality of light emitting sections are overlapped with each other in a region larger than one of the lens cells on the incident surface of the integrator.

2. An illumination optical system according to claim 1, wherein the illumination optical system satisfies the following condition:

$(2L_1 \tan \sigma - P_1)/P_2 > 1$ where $P_1$ is an interval of the plurality of light emitting sections in the specific direction, $L_1$ is a distance between the light source and the incident surface of the integrator, $\sigma$ is a divergent angle of the light beam entering the incident surface of the integrator in the specific direction, and $P_2$ is an interval of the plurality of lens cells in the specific direction.

3. An illumination optical system according to claim 1, wherein the following condition is satisfied:

$(P_2/2L_2)/\tan \sigma > 0.8$ where $L_2$ is a distance between a first lens cell in the first lens array and a second lens cell which is a counterpart of the first lens cell in the second lens array, $\sigma$ is a divergent angle of the light beam entering the incident surface of the integrator in the specific direction, and $P_2$ is an interval of the plurality of lens cells in the specific direction.

4. An illumination optical system according to claim 1, wherein a divergent angle control element which is configured to control divergent angles of the light beams from the plurality of light emitting sections is arranged between the light source and the integrator.

5. An image projection apparatus, comprising:
an illumination optical system;
a spatial light modulation element which is arranged on a plane to be illuminated; and
a projection optical system which is configured to project light from the spatial light modulation element onto a plane to be projected,
wherein the illumination optical system includes:
a light source which includes a plurality of light emitting sections arrayed in a specific direction,
an integrator which includes a plurality of lens cells arrayed in the specific direction, wherein the integrator has a first lens array and a second lens array, the first lens array including a first plurality of lens cells, the second lens array including a second plurality of lens cells, each lens cell included in the first lens array and each lens cell included in the second lens array being provided so as to be counterpart to each other; and
an overlapping optical system configured to overlap, on the plane to be illuminated, a plurality of light beams emitted from the light source and passed through the integrator,
wherein the illumination optical system illuminates the plane to be illuminated with a light beam emitted from each of the plurality of light emitting sections and passing through the integrator and the overlapping optical system,
wherein a plurality of light beams from the plurality of light emitting sections enter an incident surface of the integrator with a shift from each other in the specific direction, as divergent light beams in the specific direction, and
wherein two light beams from two light emitting sections adjacent to each other among the plurality of light emitting sections are overlapped with each other in a region larger than one of the lens cells on the incident surface of the integrator.

* * * * *